Patented Aug. 26, 1941

2,253,886

UNITED STATES PATENT OFFICE 2,253,886

PLASTIC PRODUCT

Edgar C. Britton, Gerald H. Coleman, and John W. Zemba, Midland, Mich., assignors to The Dow Chemical Company, Midland, Mich., a corporation of Michigan No Drawing. Application May 24, 1938, Serial No. 209,737

13 Claims. (Cl. 260—36)

This invention relates to certain new plastic products and in particular concerns compositions comprising polymers or co-polymers of styrene plasticized or modified with aryloxy-alkyl esters of unsaturated acids.

We have found that styrene polymers and co-polymers may be plasticized or modified with certain unsaturated esters to produce a wide variety of new plastic products useful in the preparation of molded or shaped objects, insulators, artificial rubber, etc. The new products vary in physical properties from hard, glass-like resins to soft, rubber-like materials having considerable elasticity. The resinous products may be molded or otherwise shaped to obtain clear, transparent objects which retain many of the valuable properties of polystyrene but which are less brittle and more resistant to shock breakage than polystyrene. The soft, rubber-like materials may be molded directly to form molded products which are flexible and elastic, or they may be compounded with fillers, vulcanizing agents, anti-oxidants, accelerators, plasticizers, etc. to form a wide variety of tough, elastic products closely resembling vulcanized rubber in such properties as tensile strength, elasticity, hardness, dielectric strength, etc. All of the new products are resistant to attack by dilute mineral acids, and the products prepared from the insoluble type of styrene co-polymers are substantially insoluble and non-swelling in such solvents as alcohol, acetone, aliphatic hydrocarbons, etc. Examples of such insoluble styrene co-polymers are the products obtained by polymerizing styrene in the presence of such compounds as divinyl benzene, di-allyl maleate, diallyl adipate, methallyl cinnamate, trimethallyl phosphate, the di-crotonate of 1.4-dioxanediol-2.3, allyl cinnamate, the diallyl ether of 1.4-dioxanediol-2.3, diallyl oxalate, triallyl phosphate, di-(2-chloroallyl) adipate, allyl crotonate, the di-furoate of 1.4-dioxanediol-2.3, etc.

The unsaturated aryloxy-alkyl esters which we employ as plasticizing or modifying agents for styrene polymers or co-polymers may be represented by the general formula:

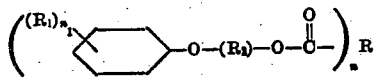

wherein R represents a hydrocarbon radical containing at least one ethylenic linkage, $R_1$ represents hydrogen or other substituent which is substantially non-reactive towards organic acids, $R_2$ represents an alkylene radical containing at least two carbon atoms, $n$ represents an integer not greater than 2, and $n_1$ represents an integer not greater than 5. Specific examples of such esters are beta-phenoxy-ethyl cinnamate, di-(beta-phenoxy-ethyl) maleate, beta-(2-chlorophenoxy-) ethyl acrylate, beta-(4-cyclohexyl-phenoxy-) ethyl cinnamate, gamma-(2-methylphenoxy-) propyl crotonate, 4-benzylphenoxy-butyl crotonate, beta-(2.4-dimethylphenoxy-) ethyl furoate, gamma-(4-phenylphenoxy-) propyl methacrylate, beta-(2.4.6-trichlorophenoxy-) ethyl methacrylate, 2.4-dibromo-phenoxy-butyl cinnamate, etc. They may be prepared by esterifying unsaturated acids with mono-aryl ethers of glycols according to the usual procedure for the preparation of esters. They act as true plasticizing agents for styrene resins in that they increase flow during molding and reduce brittleness, but in some cases they may also act as modifying agents and combine chemically with the styrene to form new co-polymeric bodies.

The new plastic products are prepared by incorporating an unsaturated ester of the present type with polystyrene or a co-polymer of styrene according to known procedure. For example, a mixture of monomeric styrene and one of the unsaturated esters may be polymerized by any convenient method to obtain the plasticized polymer directly. Similarly, a mixture of styrene and a co-polymerizing agent may be polymerized in the presence of one of the esters to obtain a plasticized co-polymer. Another convenient method for preparing our new plastic products consists in grinding or kneading the polymer or co-polymer with the ester until a homogeneous mixture is obtained. If desired, various addition agents such as fillers, dyes, pigments, etc., may also be added during such grinding or kneading operation to obtain products having properties modified by the presence of such added agents. A third method for the preparation of our new products may be employed when the styrene resin to be plasticized is a co-polymer of the type capable of being swelled by an organic solvent. This method consists in allowing the co-polymer to swell in a solution of the plasticizing agent in a solvent which is also a swelling solvent for the co-polymer, and thereafter evaporating the solvent and recovering the co-polymer having the plasticizing agent uniformly and intimately dispersed therethrough.

The proportions of polystyrene or styrene co-polymer and the plasticizing agent may be greatly varied within the limits of compatibility of the plasticizer in the styrene polymer, depending upon the particular properties desired in the plasticized product. In general, when it is desired to prepare the hard, glass-like type of product, the plasticizing agent is employed in an amount approximately equal to 2-20 per cent of the plasticized product. The soft rubber-like products are prepared by employing the plasticizing agent in somewhat larger proportion, e. g. 20-60 per cent by weight. It will be understood, of course, that the exact proportion of plasticizing agent to be employed in preparing products of given properties depends upon the particular polymers and plasticizing agents employed.

As hereinbefore mentioned, the soft, rubber-like products prepared according to the invention may be compounded with such addition agents as fillers, vulcanizing agents, accelerators, etc. to obtain tough, elastic products which closely resemble vulcanized rubber. Such products are ordinarily prepared by mixing the plasticized compositions with the desired amount of addition agents on hot compounding rolls by methods similar to those employed in compounding natural rubber. The products so prepared are, in general, more resistant to the action of oils, gasoline, etc., than is natural rubber.

The following examples will illustrate a number of ways in which the principle of the invention has been carried out but are not to be construed as limiting the same:

Example 1

A mixture of 30 parts by weight of monomeric styrene and 2.5 parts of beta-phenoxy-ethyl cinnamate was polymerized by heating at a temperature of about 85° C. for 93 hours. The polymeric product obtained was a soft, flexible, colorless solid, having considerable plasticity. It was soluble in benzene and similar aromatic hydrocarbons, but insoluble in acetone, alcohol, and aliphatic hydrocarbons.

Example 2

A mixture of 100 parts of monomeric styrene and 9 parts of di-(beta-phenoxy-ethyl) fumarate was polymerized by heating at a temperature of about 80° C. for 90 hours. The hard glass-like polymer obtained was ground, dried in a vacuum oven, and molded at 150° C. The molded test specimen had a tensile strength of about 7500 lbs./sq. in., an impact strength of about 1.0 in. lbs., and a Shore Scleroscope hardness of approximately 80.

Example 3

20 parts of the insoluble swelling polymer prepared by polymerizing 100 parts of monomeric styrene in the presence of 4 parts of trimethallyl phosphate was allowed to swell in approximately 200 parts of a 5 per cent solution of beta-(4-tertiarybutylphenoxy-) ethyl crotonate in benzene. The solvent was evaporated off under reduced pressure and the plasticized polymer obtained as a soft, flexible solid. The plasticized polymer was milled for 15 minutes between hot compounding rolls and was then molded at 160° C. The molded product was a tough, flexible solid resembling unvulcanized rubber.

Example 4

50 parts of the unplasticized co-polymer of styrene and trimethallyl phosphate employed in Example 3 was milled with 50 parts of beta-(4-tertiarybutylphenoxy-) ethyl crotonate for 20 minutes between hot compounding rolls at a temperature of about 130° C. The plasticized product was a light-gray, soft solid, having rubber-like properties.

Example 5

A mixture of 250 parts of monomeric styrene, 1.25 parts of the di-cinnamate of 1.4-dioxanediol-2.3, and 20 parts of di-(beta-phenoxyethyl) maleate was polymerized by heating at a temperature of 100° C. for 168 hours. The polymer obtained was a clear, transparent solid which swelled slightly in benzene. A molded test specimen had a tensile strength of approximately 7000 lbs./sq. in. and a Shore hardness of about 83.

Example 6

A mixture of 25 parts of styrene, 1 part of trimethallyl phosphate, and 12.5 parts of beta-(4-tertiarybutylphenoxy-) ethyl crotonate was polymerized at 100° C. for 168 hours. The plasticized polymer was a soft, colorless solid. It was milled on hot compounding rolls for about 15 minutes at 140° C. and was then molded at 160° C. to obtain a tough, rubber-like product having considerable elasticity.

Example 7

A mixture of 200 parts of styrene, 1 part of the di-cinnamate of 1.4-dioxanediol-2.3, and 20 parts of beta-(4-chlorophenoxy-) ethyl cinnamate was polymerized by heating at 100° C. for 7 days. The polymerized product was a clear, glass-like resin which was substantially insoluble in benzene. A molded test specimen had an impact strength of about 1.4 in. lbs. and a Shore hardness of about 82.

Example 8

A mixture of 25 parts of styrene, 2.5 parts of di-(2-chloroallyl) adipate, and 12.5 parts of beta-(4-tertiarybutylphenoxy-) ethyl crotonate was polymerized at 80° C. for 168 hours. The polymeric product was a clear, pale-yellow solid which swelled in benzene. It was milled at 140° C. for 10 minutes and was then molded at 160° C. The molded specimen was tough and flexible and had a tensile strength of approximately 3300 lbs./sq. in. and a Shore hardness of about 66. An unplasticized co-polymer of styrene and di-(2-chloroallyl) adipate was considerably more brittle and had a tensile strength of about 4600 lbs./sq. in. and a Shore hardness of about 75.

Example 9

A mixture of 25 parts of styrene, 1 part of diallyl maleate, and 12.5 parts of beta-(2-methylphenoxy-) ethyl furoate was heated at 100° C. for 168 hours. The product was milled at 140° C. for 15 minutes and was then molded at 160° C. The molded product was a tough, rubber-like material having considerable elasticity.

Example 10

A mixture of 90 parts of monomeric styrene and 10 parts of beta-(4-tertiarybutylphenoxy-) ethyl cinnamate was polymerized by heating at a temperature of about 100° C. for 68 hours. The polymeric product was a hard, glass-like solid, soluble in benzene. A molded test specimen had a tensile strength of approximately 8000 lbs./sq. in. and an impact strength of 1.7 in. lbs.

Example 11

50 parts of a trimethallyl phosphate-styrene copolymer, containing 4.0 per cent of trimethallyl phosphate in chemical combination, was milled with 50 parts of beta-(4-tertiarybutylphenoxy-) ethyl crotonate for 15 minutes at 140° C. The product was a soft, gum-like resin, having a Durometer A hardness of about 4, and having an elasticity value of 80 per cent.

*Example 12*

The following ingredients were mixed on hot compounding rolls at a temperature of about 125° C.:

| | Parts |
|---|---|
| Polymer prepared as in Example 11 | 100 |
| Sulfur | 1 |
| Beta-naphthol | 2 |
| Carbon black | 12.5 |
| Talc | 25 |

The plastic material so prepared was a tough, black, elastic material which closely resembled vulcanized rubber. A molded test specimen had a Durometer A hardness of about 20.

*Example 13*

An insoluble styrene co-polymer of the type capable of being swelled by benzene and similar aromatic hydrocarbon solvents was prepared by polymerizing a mixture of 200 parts of monomeric styrene and 1 part of the di-cinnamate of 1,4-dioxanediol-2,3. 20 parts of the co-polymer was allowed to swell in 200 parts of a 5 per cent solution of beta-(4-tertiarybutylphenoxy-) ethyl cinnamate in benzene. When the polymer was completely swelled, the benzene was evaporated off under vacuum and the solid polymer was dried in a vacuum oven. A molded test specimen of the plasticized polymer had a tensile strength of approximately 6600 lbs./sq. in. and an impact strength of 1.1 in. lbs.

*Example 14*

A mixture of 25 parts of monomeric styrene, 1 part of trimethallyl phosphate, and 10 parts of beta-(2-phenylphenoxy-) ethyl crotonate was polymerized by heating at a temperature of 100° C. for 168 hours. The plasticized polymer obtained was a hard, colorless resin, soluble in benzene. A molded test specimen had a tensile strength of approximately 7500 lbs./sq. in and an impact strength of about 0.9 in. lbs.

*Example 15*

A mixture of 90 parts of styrene and 10 parts of beta-(2-methylphenoxy-) ethyl cinnamate was polymerized at a temperature of about 125° C. for 3 days. The polymer was a clear, colorless resin which was soluble in benzene. A molded test specimen had an impact strength of about 1.2 in. lbs., and a tensile strength of about 8800 lbs./sq. in.

*Example 16*

The following composition was kneaded between hot compounding rolls at a temperature of approximately 140° C. for 20 minutes:

| | Parts |
|---|---|
| 4% co-polymer of styrene and trimethallyl phosphate | 50 |
| Beta-(4-tertiarybutylphenoxy-) ethylcinnamate | 50 |
| Sulfur | 1 |
| Beta-naphthol | 1 |
| Carbon black | 12.5 |
| Talc | 25 |

The product obtained was a tough, black, elastic material resembling vulcanized rubber. A molded specimen had a Durometer A hardness of about 80.

The invention is capable of many modifications and is not limited by the examples given above. For example, polymerization may be carried out in the presence of solvents, emulsions, catalysts such as benzoyl peroxide or strong mineral acids, etc., to obtain a wide variety of useful products. Also, various dyes, pigments, fillers, etc., may be incorporated in the new products before molding to produce decorative effects or to modify the physical properties of the molded product.

In the following claims, the expression "a polymerizate of styrene" is a generic expression including both the polymers and co-polymers of styrene.

Other modes of applying the principle of our invention may be employed instead of those explained, change being made as regards the process herein disclosed or the ingredients employed, provided the process or the ingredients stated by any of the following claims or the equivalent of such process or ingredients be employed.

We therefore particularly point out and distinctly claim as our invention:

1. A composition of matter comprising a polymerizate of styrene and an aryloxy-alkyl ester of an unsaturated acid.

2. A composition of matter comprising a polymerizate of styrene and an aryloxy ester of an unsaturated acid, said ester having the general formula:

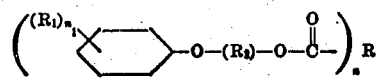

wherein R represents a hydrocarbon radical containing at least one ethylenic linkage, $R_1$ represents a substituent which is substantially non-reactive towards organic acids, $R_2$ represents an alkylene radical containing at least 2 carbon atoms, $n$ represents an integer not greater than 2, and $n_1$ represents an integer not greater than 3.

3. A composition of matter comprising a polymerizate of styrene and from about 2 to about 60 per cent of an aryloxy-alkyl ester of an unsaturated acid, said ester having the general formula:

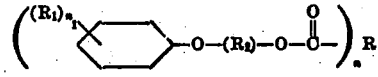

wherein R represents a hydrocarbon radical containing at least one ethylenic linkage, $R_1$ represents a substituent which is substantially non-reactive towards organic acids, $R_2$ represents an alkylene radical containing at least 2 carbon atoms, $n$ represents an integer not greater than 2, and $n_1$ represents an integer not greater than 3.

4. A composition of matter comprising a polymerizate of styrene and from about 2 to about 60 per cent of an aryloxy-alkyl ester of an unsaturated acid, said ester having the general formula:

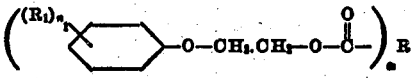

wherein R represents a hydrocarbon radical containing at least one ethylenic linkage, $R_1$ represents a substituent which is substantially non-reactive to organic acids, $n$ represents an integer not greater than 2, and $n_1$ represents an integer not greater than 3.

5. A composition of matter comprising a polymerizate of styrene and from about 2 to about 60 per cent of an aryloxy-alkyl ester of an unsaturated acid, said ester having the general formula:

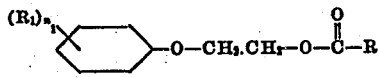

wherein R represents a hydrocarbon radical containing at least one ethylenic linkage, $R_1$ represents a substituent which is substantially non-reactive to organic acids, and $n_1$ represents an integer not greater than 3.

6. A composition of matter comprising a polymerizate of styrene and from about 2 to about 60 per cent of an aryloxy-alkyl ester of an unsaturated acid, said ester having the general formula:

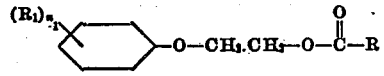

wherein R represents a hydrocarbon radical containing at least one ethylenic linkage, $R_1$ represents an alkyl radical, and $n_1$ represents an integer not greater than 3.

7. A composition of matter comprising a polymerizate of styrene and from about 2 to about 60 per cent of an aryloxy-alkyl ester of an unsaturated acid, said ester having the general formula:

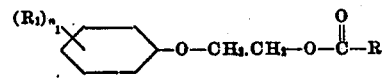

wherein R represents a hydrocarbon radical containing at least one ethylenic linkage. $R_1$ represents halogen, and $n_1$ represents an integer not greater than 3.

8. A composition of matter comprising a polymerizate of styrene and beta-(4-tertiarybutylphenoxy-) ethyl crotonate.

9. A composition of matter comprising a polymerizate of styrene and di-(beta-phenoxy-ethyl) maleate.

10. A composition of matter comprising a polymerizate of styrene and beta-(4-tertiarybutylphenoxy-) ethyl cinnamate.

11. A composition of matter prepared by compounding the product as defined in claim 1 with a vulcanizing agent, a vulcanization accelerator, and a filling material.

12. The process which comprises polymerizing styrene in the presence of an aryloxy-alkyl ester of an unsaturated acid, said ester having the general formula:

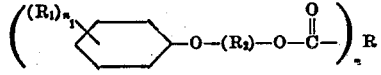

wherein R represents a hydrocarbon radical containing at least one ethylenic linkage, $R_1$ represents a substituent which is substantially non-reactive towards organic acids, $R_2$ represents an alkylene radical containing at least two carbon atoms, $n$ represents an integer not greater than 2, and $n_1$ represents an integer not greater than 3.

13. The process which comprises compounding the product as defined in claim 1 with a vulcanizing agent, a vulcanization accelerator, and a filling material.

EDGAR C. BRITTON.
GERALD H. COLEMAN.
JOHN W. ZEMBA.